United States Patent [19]
Takiguchi et al.

[11] 4,238,012
[45] Dec. 9, 1980

[54] SHIFT FORK IN MANUAL TRANSMISSION

[76] Inventors: Hiroshi Takiguchi, No. 1591-16, Hirato-cho, Totsuka-ku, Yokohama-shi, Kanagawa-ken; Tsuneyoshi Ohhazama, No. 1-1, 1-chome, Iwai-cho, Hodagaya-ku, Yokohama-shi, Kanagawa-ken, both of Japan

[21] Appl. No.: 951,775

[22] Filed: Oct. 16, 1978

[30] Foreign Application Priority Data

May 13, 1978 [JP] Japan .................................. 53-64488

[51] Int. Cl.³ .................... F16D 11/10; F16D 21/04; F16D 23/06
[52] U.S. Cl. ................... 192/48.91; 74/473 R; 192/53 F; 192/82 R; 308/165
[58] Field of Search ............... 192/48.91, 53 F, 82 R; 74/473 R; 308/163, 165

[56] References Cited
U.S. PATENT DOCUMENTS

| 2,442,660 | 6/1948 | Neracher | 74/473 R |
| 3,257,861 | 6/1966 | Siefferman | 74/473 R |
| 3,915,027 | 10/1975 | Simmons et al. | 74/473 R |

Primary Examiner—Allan D. Herrmann
Attorney, Agent, or Firm—George B. Oujevolk

[57] ABSTRACT

An improvement is made to the shift fork which engages the circumferential groove of a clutch means slidable along an axial line of a main shaft. The shift fork is composed of a piece made of material having high wear resistibility and a main body whose end part is smaller in cross section than the circumferential groove of the clutch. The piece is in the shape of a channel section and has an elastic tongue-like projections projecting from the bottom of this channel section. The tongue projections are urged, as being fastenings, into grooves formed at the end parts of said main body, whereby the piece is tightly attached to the main body to thus form parts engaging said circumferential grooves of the clutch means.

9 Claims, 22 Drawing Figures

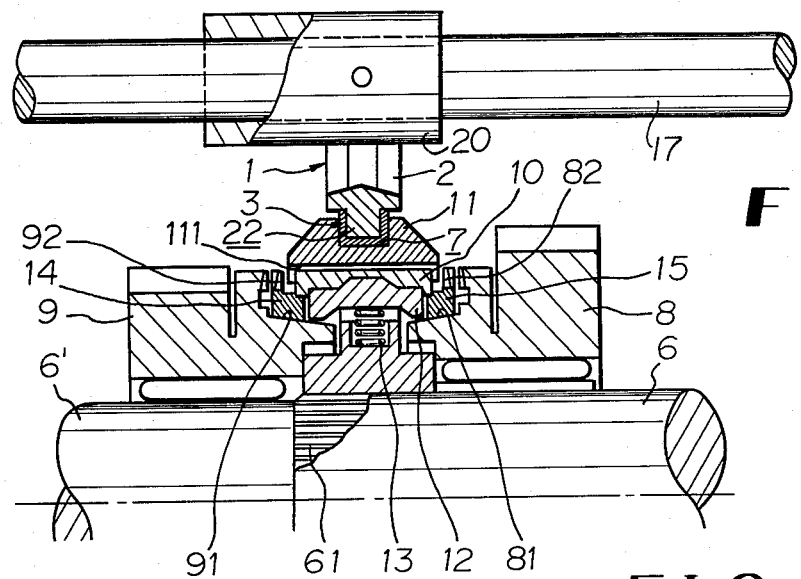
FIG_1
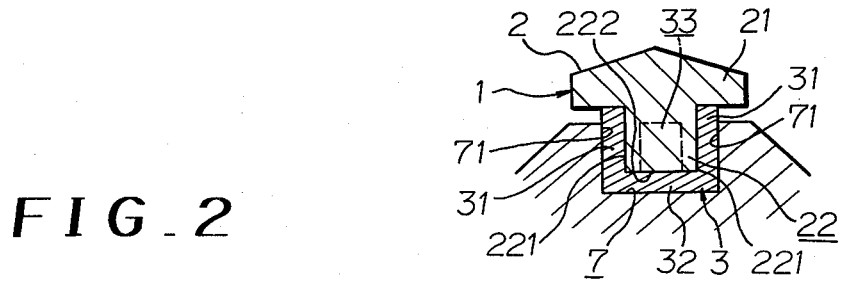
FIG_1a
FIG_2
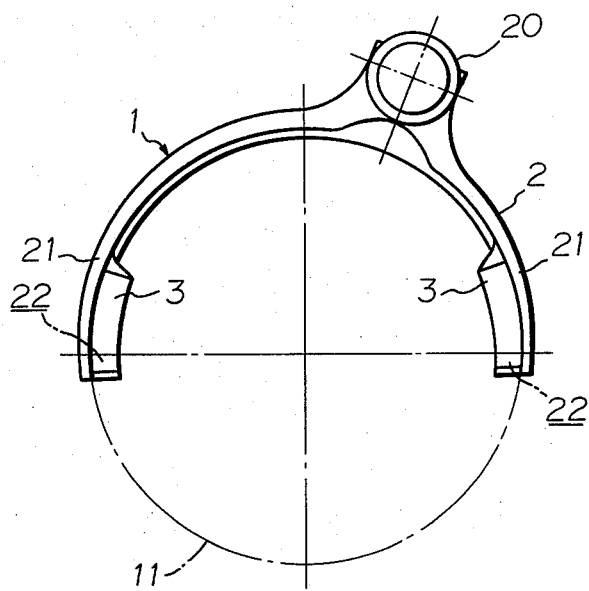
FIG_3
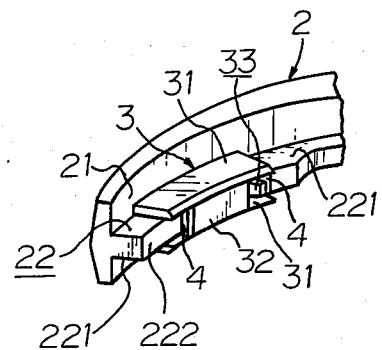

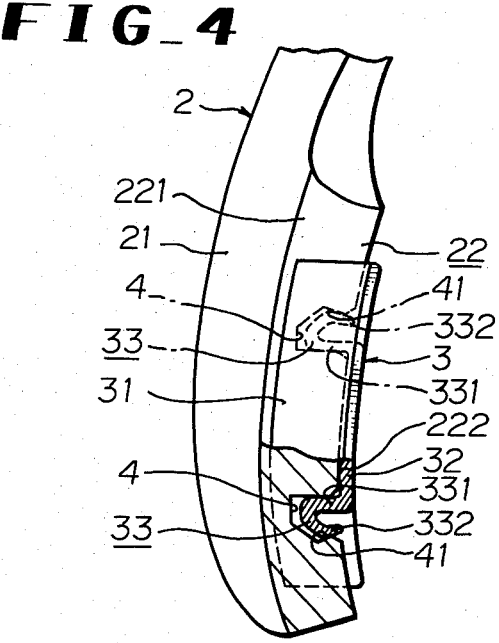
FIG_4
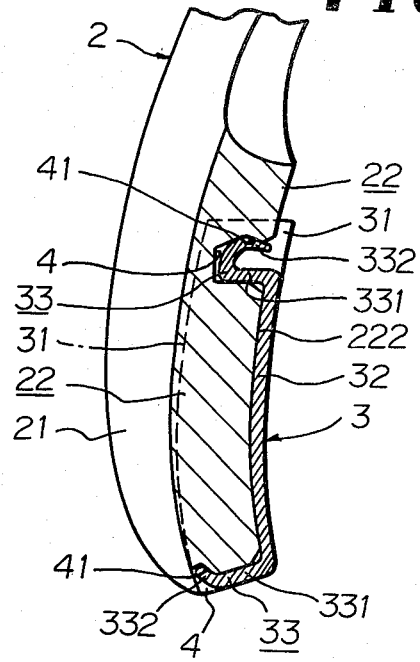
FIG_5
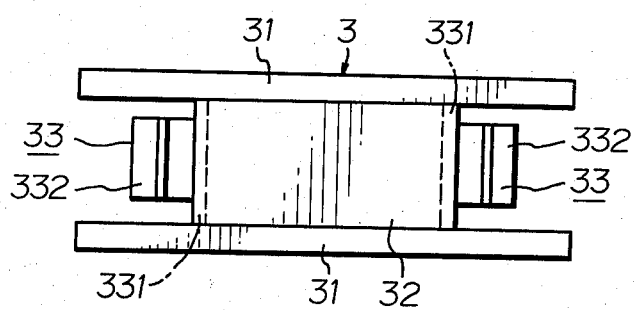
FIG_6
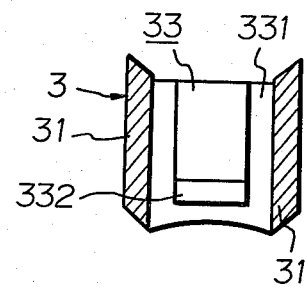
FIG_8
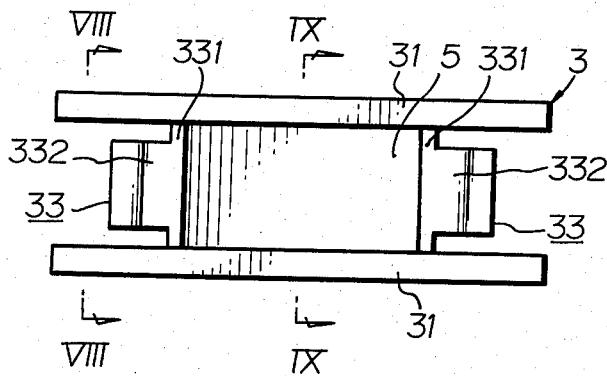
FIG_7
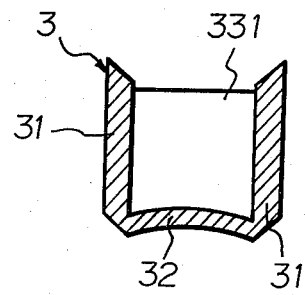
FIG_9

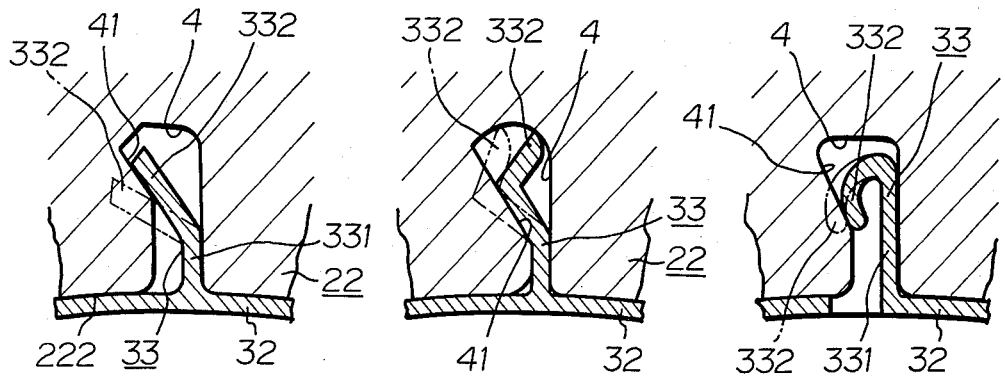
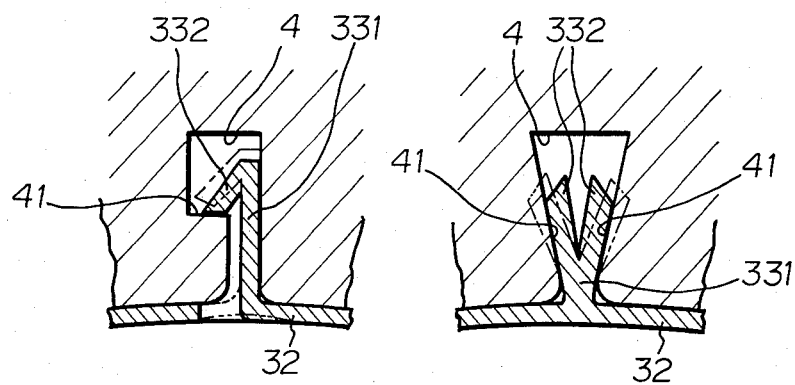
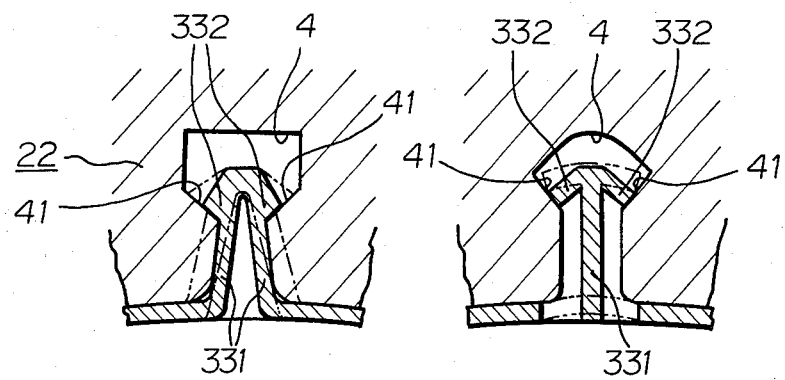

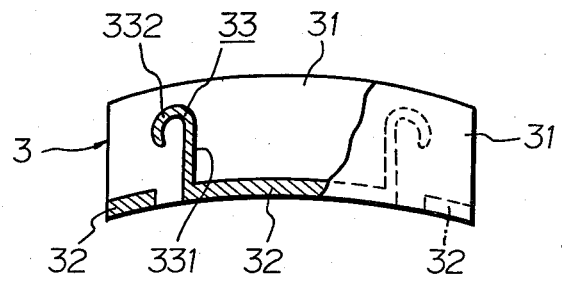
FIG_11
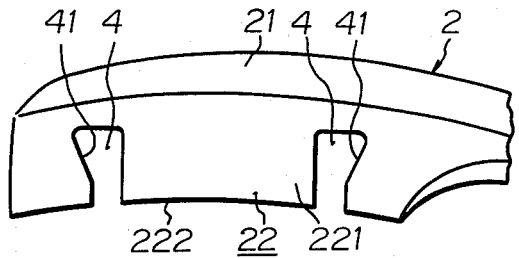
FIG_12
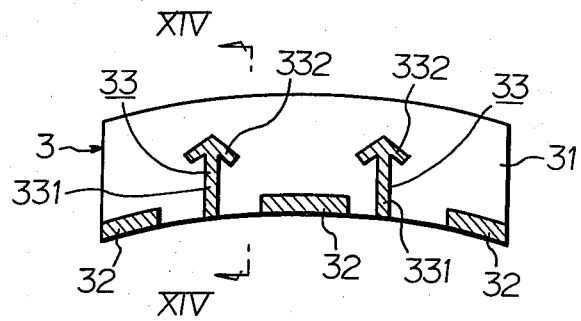
FIG_13
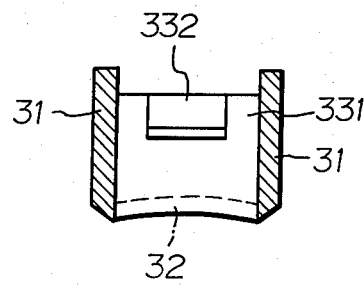
FIG_14
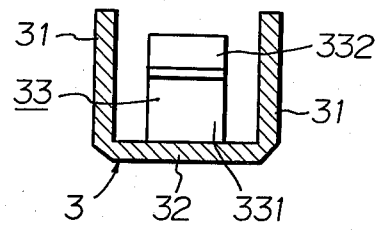
FIG_15

SHIFT FORK IN MANUAL TRANSMISSION

BACKGROUND OF THE INVENTION

The present invention relates to a shift fork in a manual transmission of motor vehicles, and more particularly to an improved shift fork for sliding a clutch means in a manual transmission of the synchromesh type.

BRIEF EXPLANATION OF THE PRIOR ART

A manual transmission is in general provided with a shift fork. The shift fork of the synchromesh type manual transmission is mounted on a shiftable fork rod or shift rod in the vicinity of the action of a shift lever, and its free end is engaged in a groove of the clutch means (usually a coupling sleeve) rotating together with a main shaft. Upon gear shifting, the shift fork is shifted together with the shift rod so as to shift the clutch means and provide a desired gear ratio.

At acceleration, due to the difference in rotation between the clutch and an accelerating transmission gear, at first the cone side of the gear and a balk ring of a synchronizer mesh with each other to effect a rotational synchronization therebetween, and subsequently the clutch is shifted to provided an engagement between the spline of its inner circumference and a spline of the accelerating transmission gear.

Thus, the shift fork urges the clutch to the transmission gear during the transmission operation. The larger the difference in rotational speed between the transmission gear and the clutch, the larger urging time it takes; the higher the rotational speed of the engine and the nearer the clutch comes to the acceleration, the larger is the difference in rotational speed. Recently, there have been developed many transmission systems which have an over drive gear ratio. In some of them, the difference in rotational speed reaches 30m/sec.

Therefore, the shift fork is subjected to severe conditions of wear and tear, and particularly a large friction force acts on a part engaging a groove extending circumferentially through the peripheral surface thereof so that this part is subject to unwanted wear in a short period of time to generate a gap, due to which the clutch is not fully moved and thus brings about an unsatisfactory meshing with the gear.

To remedy these defects, the prior art roughly shapes the shift fork of a special cast iron such as malleable cast iron or some other structural steel for mechanical structures such as S45C and S55C through the shell molding process or hot forging, and forms parts to engage in the groove of the clutch by a machining process, and a high frequency hardening process or surface plating treatment is carried out on the parts to impart wear resistibility thereto.

However, since the entire body of the shift fork is made of hard material and the part to engage with the clutch is subjected to a precision process or a hardening treatment, the cost of the material is high and the processing steps are many so that the cost is exceedingly expensive. Furthermore, since the shift fork meshes with the clutch and a hard groove surface, adhesion is easily produced therebetween with only a heat treatment or metal plating on this part, and therefore it is not satisfactory as to wear resistibility and the durability obtained is not good. As wear advances, the whole of the shift fork has to be exchanged for which time and money are needed.

OBJECTS OF THE INVENTION

The objectives of this invention is to remove the shortcomings of the conventional shift fork. It is accordingly a principal object of this invention to provide an improved shift fork having a good engagement in the circumferential groove of the clutch with good wear resistibility and durability in the parts to be engaged, and making it possible to exactly transmit the working force of the shift rod to the clutch.

It is another object of the invention to provide a shift fork which is simple in structure, easy to produce and economical.

It is a further object of the invention to provide a shift fork which may be easily repaired instead of exchanging the entire shift fork when it is worn.

It is still a further object of the invention to provide a shift fork which is of light weight and light for manual transmission.

In addition, it is another object of the invention to provide a righd attachment to the part to engage the clutch of the shift fork without using welding or a binding agent and thereby improve the anti-shock properties.

SUMMARY OF THE INVENTION

Generally speaking, the shift fork contemplated herein is composed of a main body having an end part, a cross-section of which is smaller than that of the circumferential groove of the clutch, and a piece made of high wear resistible material inherently independent of the main body.

The piece has a channel-shape cross section with a pair of parallel flanges whose inner sides hold a surface of the end point of the shift fork therebetween and whose outer sides contact the circumferential groove of the clutch, and, a web bridging the parallel flanges which has a plurality of elastic tongue-like projections at the bottom of the channel.

The end part of the main body of the shift fork is formed with grooves of the same number as the tongue-like projections from a transverse direction to an axial line of the shift rod. The groove is narrow at the opening thereof and flares at the interior, and has an engaging face for elastically contacting the tongue-like projection at one side at least of the interior.

The piece contacts the end part of the shift fork by means of the channel, and, after having been forced into the groove, the tongue-like projection is secured in the groove by its spring-back resilient property so that the piece is tightly and integrally attached to the main body of the shift fork as a fastener.

The invention as well as other objects and advantages thereof will become more readily apparent from the following detailed description and the accompanying drawings, in which:

BRIEF DESCRIPTION OF THE DRAWINGS

FIG. 1 is a vertical cross-sectional view showing parts of the manual transmission of the synchromesh type provided with the shift fork contemplated herein;

FIG. 1-a is an enlarged view of the engagement between the shift fork in FIG. 1 and a clutch means.

FIG. 2 is a side view of the shift fork in FIG. 1;

FIG. 3 is a perspective view showing one embodiment of the shift fork contemplated herein;

FIG. 4 is a side view, partially in section, of the shift fork shown in FIG. 3;

FIG. 5 is a side view, partially in section, of another shift fork according to the inventive concept;

FIG. 6 is a bottom view showing an embodiment of a piece used in the inventive concept;

FIG. 7 is a plan view of the piece shown in FIG. 6;

FIG. 8 is a cross-sectional view along line VIII—VIII in FIG. 7;

FIG. 9 is a cross-sectional view along line IX—IX in FIG. 7;

FIGS. 10(A) through 10(G) show cross-sectional views of embodiments of tongue-like projections of piecies according to the inventive concept;

FIG. 11 is a cross-sectional view, partly in section, of the piece shown in FIG. 10(C);

FIG. 12 is a side view of a main body of the shift fork for the piece of FIG. 10(C);

FIG. 13 is a vertical cross-sectional view of the piece in FIG. 10(C);

FIG. 14 is a cross-sectional view along line XIV—XIV in FIG. 13; and,

FIG. 15 is a cross-sectional view of another embodiment of a piece according to the inventive concept.

DETAILED DESCRIPTION

FIG. 1 shows a manual transmission of a synchromesh type provided with a shift fork according to the inventive concept. This synchromesh type of manual transmission is composed of transmission gears 8, 9 mounted on a main shaft 6 with a drive shaft 6' and bearings, a clutch means 11 (a coupling sleeve in the drawing) which is mounted on the outer circumference of the main shaft 6 between the transmission gears 8, 9 and shiftable along an axial line of the main shaft 6, and a shift fork, shifting the clutch means 11 to engage the transmission gears 8, 9.

The shift fork 1, as shown in FIG. 1 and FIG. 3, is composed of a semi-circular main body 2 and a piece 3 of high wear resistible material prepared independently of the main body 2.

The semi-circular main body 2 has a boss 20 for coupling to the shift rod 17 at its top part, and the shift rod 17 is connected to a shift lever (not shown) and is shifted with the shifting of the shift lever. The main body 2 is formed with a comparatively wide wall 21 extending from the boss 20 to a free end. The wall 21 is, as shown in FIG. 1 and FIG. 1-a, formed on its inner side with an end portion 22 in a preferred length, a size which corresponds to less than the size of the circumferential groove 7 of clutch 11, at the end portion 22 the piece 3 is provided in circumferential groove 7.

The clutch 11 engages with an outer circumferential spline formed on a hub 10 which is mounted on an outer circumferential spline 61 of the main shaft 6 so that the clutch 11 is shiftable on the hub 10 in the axial direction thereof. The hub 10 has a plurality of key grooves on its inner circumference on which keys 12 are fitted. The keys 12 are urged towards an inner spline 111 of the clutch 11 by a spring 13. Thus, the clutch 11 and the hub 10 are interlocked. The transmission gears 8, 9 are slidably provided with balk rings 14, 15 at portions of the cone 81, 91, and each of the rings 14, 15 has three cutouts for engaging the keys 12, and splines 82, 92 for coupling with the clutch 11.

The end part 22 of the main body 2 of the shift fork, that is, the part positioned in the groove 7 of the clutch 11, is, as shown in FIG. 1 or FIG. 3, composed of a pair of parallel faces 221, extending from the wall 21 and a part 222 bridging the parallel faces 221.

As illustrated in FIGS. 4, 5, 11 and 12, the end part 22 of the main body is formed from bridging part 222 with a plurality of grooves 4 with a predetermined distance in a direction transverse to the axial direction of the shift rod 17. The grooves 4 may be provided as shown in FIG. 4 or may be provided as shown in FIG. 5, that is, in the former case, the grooves 4 are formed at the inner sides of the main body 2, and in the latter case, one of the grooves 4 is formed at the end 22 of the main body 2 and the other is formed at the inner side.

The grooves 4 are prepared in shapes for holding tongue-like projections 33 extending from a web 32 (see FIG. 10). In any case, the groove 4 is so shaped that it is narrow around its opening and flares in the interior, and has an engaging face 41 for pressing the tongue-like projection at one side at least of the interior.

The main body 2 is made of materials having the desired mechanical strength, for example, non-metallic light alloys such as aluminum die cast alloy, iron and steel such as cast iron, soft steel or high polymer material such as nylon or acetal synthetic resin.

On the other hand, piece 3 should be made of materials having a high wear resistibility, for example, a copper alloy such as high manganese brass, alloy steel with dispersion of chromium or tungsten carbide, or high polymer material such as nylon, or acetal synthetic resin.

The piece 3 is not so long as to cover on overall length of the inner side of wall 21, but as shown in FIG. 2 or FIG. 9 it is almost the same size as end part 22 or somewhat smaller.

As seen in FIGS. 1 and 1-a, piece 3, in its entire length is of channel section, and is composed of a pair of flanges 31 each of which is of such a thickness that it contacts at its inner side the face 221 of the main body 2, and contacts a side wall 71 at its outer side, and a web 32 for integrally connecting the flanges 31 to the bridging part 222 at the inner part of the web 32. In other words, the flanges 31 are parallel walls and the web 32 is a bridging wall. The web 32 and the flanges 31 are smooth on the surfaces and curved in plan to meet a curvature of the end part 22.

The web 32 may be either so formed as to cover the overall length of flange 31, or flange 31 extends from an end of the web 32 as illustrated in FIG. 4 or FIG. 5 or the web 32 is disposed discontinuously at both ends of flanges 31 and at the center portion as seen in FIG. 11 or FIG. 13.

At the inner side of the channel section which is the bottom of the web 32, a plurality of elastic tongue-like projections 33 are formed towards an opening of the channel.

The tongue-like projections are the same in number as the grooves 4 of the main body 2 and at the same intervals as the grooves 4.

The tongue-like projection 33 is composed of a part 331 projecting from the bottom of the web 32 and a bending part 332 contiguous thereto with elastic springback characteristics. The bending part 332 is formed larger than the opening of the groove 4 so that it is compressively deformed when it is urged into the groove after which it recovers to press to an engaging part 41 at an appropriate pressure.

FIGS. 4 to 10(A) through 10(G) show embodiments of the bending parts 332. In FIGS. 4, 6 and 9, the bending part turns down inwardly. In FIG. 10(A), the bending part 332 extends upwards and obliquely and is straight. In FIG. 10(B), the bending part 332 is formed in a V-shape at the standing portion 331. FIG. 10(C) shows a turned down U-shape. In FIG. 10(D) the bending part stretches obliquely straight down. FIG. 10(E) shows a V-shape bending part. FIGS. 10(F) and 10(G) show T-type shapes where the bending part extends obliquely downward towards the right and left sides. In FIGS. 10(D), 10(G) the bending parts are caught by the engaging parts 14 with a tension force which is caused when the web 32 curved by urging the tongue-like projections 33 is released.

In either case, at least the bending part 332 of the tongue-like projection should be narrower in width than an interval between the flanges 31 and be independent of the flanges. The extending part 331 may contact the flanges 31 at both sides of the width, and this is shown in FIGS. 6 to 9. The flanges 31, the web 32 and the standing parts 331 define a rectangular space 5. FIG. 15 shows an example of the standing part 331 independent of the flanges 31.

In piece 3, the web 32 which is the bottom of the channel section is positioned to face part 222 connecting the parallel faces 221 at the end part 22 of the main body 2, and the piece 3 is attached to the main body 2 by the urging of web 32. By this urging action, the bending parts 332 of the tongue-like projections 33 outside the groove 4 are compressed at the narrow opening and urged thereinto and at the same time the flanges 31 slide on the parallel faces 221 of the main body 2. The bending part 332 is initially bent to the innermost part of groove 4 and recovers there. When the web 32 contacts the connecting part 222 of the parallel faces 221, the flanges 31 lay close to the parallel faces 221, and the bending parts 332 contacts the engaging part 41 of the groove 4. FIGS. 10(A) to 10(G) show the deformations of the tongue-like projections 33 with dotted lines.

OPERATION OF THE INVENTION

Shift fork 1 is secured to the shift rod 17 by the boss 20 and coupled to the transmission. The piece 3 is in the shape of a channel section, and since a pair of flanges 31 tangentially contact the inner face of parallel faces 221 of the main body 2, there is no loosening in a direction parallel to the axial line of the shift rod. Further, since the tongue-like projection 33 is urged into the groove 4 formed in the direction transverse to the axial direction of the shift rod, and the bending part 332 of the tongue-like projection 33 is pushed to the engaging face 41 at the interior of groove 4. Also, there is no loosening in a direction transverse to the axial line of the shift rod. That is to say, although piece 3 is independent of the main body 2, it is not loose but strongly attached to the main body 2, and under this condition, a pair of flanges 31 contact the outer faces of the side walls 71 of the circumferential grooves 7 of the clutch 11. The flange is made of high wear resistible material, and therefore the force generated at the transmission operation can be properly transmitted to the clutch 11, and the amount of wear on the whole surface contacting the side wall 71 is considerably reduced. Since the piece 3 is tightly fixed to the main body 2, there is no abnormal wearing, and the smooth and stable action of the shift can be carried out for a long period of time.

In view of the foregoing, the materials to be used for the main body 2 are not limited and do not need special high wear resistibility nor the plating or the heat treatment. Thus, the production cost is lowered. With respect to piece 3, it is provided at the end point of the main body 2, not over the whole length, and the amount of using the wear resistible material is lessened. It is readily formed by press work or injection molding, including the tongue-like projections. The shift fork 1 may be readily attached to the main body 2 by pushing the web 32 without using a binding agent or by welding. In addition since the tongue-like projection 33 has a spring-back action, the production error is absorbed to a certain extent in relation to the grooves 4 so that high precision can be obtained in engaging the part with clutch 11. Thus, a shift fork having excellent properties can be obtained. Furthermore, when the main body 2 is made of an aluminum alloy and the piece 3 is made of a high polymer material such as nylon, an ideal shift may be obtained with durability and light weight.

For the purpose of giving those skilled in the art a better understanding of the invention, the following illustive examples are given

EXAMPLE 1

(I) The main body of the shift fork was made of an aluminum die cast alloy (ADC-10), provided with a hole for the shift rod, and the aluminum bronze was used for the piece material, and, the piece having the tongue-like projection as shown in FIG. 10(A) was prepared. This piece was attached to the end point of the main body in the same manner as shown in FIG. 4. For comparison, another shift fork of the same size and shape as the foregoing shift fork was prepared with malleable cast iron (FCMP-60). Both were mounted to the transmission and the two were subjected to an endurance test. The test conditions were as follows:

(i) Rotation speed of propeller shaft
    2000 rpm
(ii) Axial force applied to coupling sleeve
    50 kg
(iii) Loading duration
    0.15–0.25 sec
(iv) Loading times
    100,000 times
(v) Oil temperature
    65°–70° C. (SAE No. 90 gear oil)

(II) Test results are shown in the following table 1:

TABLE 1

| Test No. | Amount of Wear (mm) | |
| --- | --- | --- |
| | Shift Fork of Invention | Shift Fork of Prior Art |
| 1 | 0.02 | 0.17 |
| 2 | 0.04 | 0.12 |
| 3 | 0.02 | 0.12 |
| Average | 0.027 | 0.136 |

(III) The same shift forks as in Example 1 were tested for wear conditions by rotating the coupling sleeve in oil. The test results were as follows:

(i) Rotation speed of coupling sleeve
    2,500 rpm
(ii) Axial force applied to coupling sleeve
    60 kg
(iii) Loading times
    0.40 sec.
(iv) Loading times
    10,000 times
(v) Oil temperature
    70±2° C. (SAE No. 90 gear oil)

Test results are shown in the following table 2:

TABLE 2

| Test No. | Amount of Wear (mm) | |
|---|---|---|
| | Shift Fork of Invention | Shift Fork of Prior Art |
| 1 | 0.01 | 0.17 |
| 2 | 0.02 | 0.12 |
| 3 | 0.02 | 0.12 |
| Average | 0.017 | 0.136 |

(IV) From Table 1 and Table 2, it is apparent that the shift fork according to the invention has much higher wear resistible rather than the conventional one.

EXAMPLE 2

(I) The piece was made of nylon by injection molding and provided with tongue-like projections shown in FIGS. 4, 6 and 9. The main body of the shift fork was made of the aluminum die cast alloy (ADC-10) on which the above piece was mounted as shown in FIG. 4. As in Example 1, the endurance tests were carried out in comparison with a shift fork made of malleable cast iron (FCMP-60) whose end point was treated with high frequency hardening . tests were made with the transmission and in oil. The test conditions were the same as in Example 1.

The test results are shown in Table 3 (endurance test in transmission) and in Table 4 (test in oil).

TABLE 3

| Test No. | Amount of Wear (mm) | |
|---|---|---|
| | Shift Fork of Invention | Shift Fork of Prior Art |
| 1 | 0.04 | 0.17 |
| 2 | 0.02 | 0.12 |
| 3 | 0.05 | 0.12 |
| Average | 0.036 | 0.136 |

TABLE 4

| Test No. | Amount of Wear (mm) | |
|---|---|---|
| | Shift Fork of Invention | Shift Fork of Prior Art |
| 1 | 0.05 | 0.17 |
| 2 | 0.04 | 0.12 |
| 3 | 0.04 | 0.12 |
| Average | 0.043 | 0.136 |

(II) From Table 3 and Table 4, it is apparent that the shift fork according to the invention has much higher wear resistible 3.2 to 3.8 times of the conventional one.

What is claimed is:

1. In a manual transmission of the synchromesh type, having transmission gears (8, 9) mounted on a main shaft (6) and a drive shaft (6'), a clutch means (11) with a circumferential groove shiftable along an axial line of the main shaft between the transmission gears, and a shift fork (1) shifting the clutch means to engage the transmission gears, an improved shift fork for manual transmission comprising:
   (a) a main body (2) with an end part (22) smaller in cross-section than the circumferential groove (7) of the clutch means (11);
   (b) a piece (3) made of a material having high wear resistibility, said piece (3) having a channel shape section and integrally formed with a plurality of elastic tongue-like projections (33) on the bottom of the channel shape section; and,
   (c) grooves (4) in said main body (2) formed at said end parts (22), said grooves (4) corresponding to the tongue-like projections (33), said tongue-like projections (33) being urged into said grooves (4) so as to tightly attach the piece (3) to the end part (22) of the main body of the shift fork.

2. A shift fork as claimed in claim 1, wherein
   (a) said end part (22) of the main body (2) is composed of a pair of parallel faces (221) extending from a wall (21) of the main body and a bridging part (222) bridging the parallel faces;
   (b) said piece (3) being composed of a pair of flanges (31) each of which is sufficiently thick that it contacts at the inner side the parallel faces, and the groove wall (71) at the outer side; and,
   (c) a web (32) coupling the flanges (31) at one side of the flanges, said tongue-like projections (33) projecting from the web.

3. A shift fork as claimed in claim 1, wherein the groove (4) is formed at the end part of the main body in a direction transverse to the axial line of the main shaft (6) from the part (222) bridging the parallel faces (221), the groove being narrow around its opening and having an engaging face (41) for pressing the tongue-like projection at one side at least of its interior.

4. A shift fork as claimed in claim 3, wherein the grooves (4) are all formed at the inner sides of the main body.

5. A shift fork as claimed in claim 3, wherein one of the grooves is formed at an end portion of the main body (2).

6. A shift fork as claimed in claim 2, wherein said groove (4) has a flared interior section, said elastic tongue-like projection being composed of a projecting part (331) projecting from the bottom of the web (32) and a bending part (332) extending from the bottom and separating from the flange (31), and the tongue-like projection is compressed when it is urged into the groove (4) and recovers at the flared interior section.

7. A shift fork as claimed in claim 6 wherein the piece (3) is made of a copper alloy, steel alloy or high polymer material.

8. A shift fork as claimed in claim 6 wherein the main body (2) is made of a light alloy or high polymer material.

9. A shift fork as claimed in claim 6 wherein the bending part is a snap-anchor.

* * * * *